(12) United States Patent
Grasso et al.

(10) Patent No.: US 8,508,569 B2
(45) Date of Patent: Aug. 13, 2013

(54) VIDEO COMMUNICATION METHOD AND SYSTEM

(75) Inventors: Ennio Grasso, Turin (IT); Pier Carlo Paltro, Turin (IT); Andrea Sorrente, Turin (IT); Claudio Teisa, Turin (IT)

(73) Assignee: Telecom Italia S.p.A., Milan (IT)

( * ) Notice: Subject to any disclaimer, the term of this patent is extended or adjusted under 35 U.S.C. 154(b) by 856 days.

(21) Appl. No.: 12/448,647

(22) PCT Filed: Dec. 28, 2006

(86) PCT No.: PCT/EP2006/012578
§ 371 (c)(1),
(2), (4) Date: Jan. 14, 2010

(87) PCT Pub. No.: WO2008/080421
PCT Pub. Date: Jul. 10, 2008

(65) Prior Publication Data
US 2010/0134587 A1    Jun. 3, 2010

(51) Int. Cl.
*H04N 7/14* (2006.01)

(52) U.S. Cl.
USPC ........................................................ 348/14.01

(58) Field of Classification Search
USPC .. 348/14.01, 14.03, 14.05, 14.08; 379/93.17, 379/93.21, 93.23, 265.09
See application file for complete search history.

(56) References Cited

U.S. PATENT DOCUMENTS

| | | | |
|---|---|---|---|
| 6,141,413 A * | 10/2000 | Waldner et al. | 379/93.23 |
| 6,335,928 B1 | 1/2002 | Herrmann et al. | |
| 6,438,599 B1 * | 8/2002 | Chack | 379/265.09 |
| 6,728,934 B1 * | 4/2004 | Scopes | 379/88.13 |
| 2002/0034177 A1 | 3/2002 | Herrmann et al. | |
| 2002/0164000 A1 * | 11/2002 | Cohen et al. | 379/88.17 |
| 2003/0103606 A1 * | 6/2003 | Rhie et al. | 379/88.13 |
| 2004/0128136 A1 | 7/2004 | Irani | |
| 2006/0203975 A1 | 9/2006 | Erhart et al. | |
| 2006/0203976 A1 | 9/2006 | Erhart et al. | |
| 2006/0203977 A1 | 9/2006 | Erhart et al. | |
| 2006/0203978 A1 | 9/2006 | Erhart et al. | |
| 2008/0158336 A1 * | 7/2008 | Benson et al. | 348/14.08 |
| 2009/0100488 A1 * | 4/2009 | Sakamoto et al. | 725/112 |

FOREIGN PATENT DOCUMENTS

| EP | 1 701 528 A2 | 9/2006 |
|---|---|---|
| WO | WO-03/094473 A2 | 11/2003 |

* cited by examiner

*Primary Examiner* — Stella Woo
(74) *Attorney, Agent, or Firm* — Finnegan, Henderson, Farabow, Garrett & Dunner, L.L.P.

(57) ABSTRACT

A method of communication with a remote user provided with a videocommunication terminal includes: establishing a communication session with the user's videocommunication terminal; loading a web page associated with the communication session, the loaded web page including at least one portion defining a respective association between at least one browsing action to be performed on the loaded web page and at least one predefined user interaction with the videocommunication terminal; rendering the loaded web page and forming an image corresponding to the rendered loaded web page; video-encoding the formed image so as to create an encoded video, and transmitting the encoded video to the user's videocommunication terminal; concurrently with the transmitting of the encoded video, receiving information related to a predefined user interaction with the videocommunication terminal; retrieving from the loaded web page the browsing action associated with the predefined user interaction with the videocommunication terminal; and executing the retrieved browsing action.

20 Claims, 5 Drawing Sheets

```
<head>
  <title>...</title>
  ...
  <VIS_EXTENSIONS>
    <COMMAND1 parameter1_1 = "value1_1" parameter1_2 = "value1_2"...>
    <COMMAND2 parameter2_1 = "value2_1" parameter2_2 = "value2_2"...>
    ...
  </VIS_EXTENSIONS>
  ...
</head>
<body>
  HTML Code
</body>
```

Fig.4

VIDEO COMMUNICATION METHOD AND SYSTEM

CROSS REFERENCE TO RELATED APPLICATION

This application is a national phase application based on PCT/EP2006/012578, filed on Dec. 28, 2006.

FIELD OF THE INVENTION

The present invention relates to the field of telecommunications services. In particular, the present invention relates to telecommunications services to be enjoyed with videocommunication terminals.

BACKGROUND OF THE INVENTION

Interactive voice response (IVR) systems allow handling of telephone calls from telecommunications terminals, and are typically used by enterprises for the provision of service offerings, such as customer care, help desk assistance, value added services, and so on. An IVR system typically renders a hierarchy of "spoken" menus to the caller, and prompts the caller for input to navigate within the menus and provide information. Typically, input commands are provided by the caller with the aid of the telephone keypad and propagated in the telecommunications network via Dual Tone Multi-Frequency (DTMF) signaling; sometimes, input commands could also be provided directly by voice. User inputs may correspond to menu options to navigate the IVR system and locate the desired information, or they may represent data information provided by the user to the IVR system (e.g. a bank account number, a Personal Identification Number, or PIN, etc.).

An IVR system normally hosts one or more IVR applications, comprising scripts that specify what speech has to be generated by the IVR system, what input(s) to collect from the caller, and what actions to trigger in response to caller input(s).

For example, an IVR system application might comprise a script that presents a main menu to the caller in response to a call thereof, and additional scripts that correspond to each of the menu options comprised in the main menu, or in other, hierarchically deeper menus.

The language typically used for defining scripts to be used in IVR system applications is the Voice eXtensible Markup Language (VoiceXML, or VXML). The Voice eXtensible Markup Language is an instantiation of the eXtensible Markup Language (XML) purposefully designed for specifying audio dialogs that feature synthesized speech, digitized audio, recognition of spoken and DTMF input, recording of spoken input, telephony, and mixed initiative conversations. According to the W3C Recommendations, the major goal of VXML is to bring the advantages of Web-based development and content delivery to interactive voice response applications.

IVR system applications taking advantage of a video channel communication in addition to the traditional voice channel communication have also been recently envisioned and implemented. To fully appreciate such video enhanced applications, users will need videocommunication terminals (such as videotelephones), which are increasingly becoming popular both in fixed and mobile telecommunications networks.

US Patent Application no. US 2006/0203975 discloses an IVR system enabled to deliver content streams of various media types (e.g. video, audio, etc.) to telecommunications terminals via the addition of extensions to the VXML standard. The IVR system delivers a particular content stream to a terminal only if: (i) the terminal has a transducer (e.g. speaker, video display, etc.) that is capable of outputting the content stream's media type, and (ii) that transducer is currently enabled.

US Patent Application no. US 2006/0203976 discloses an IVR system enabled to intelligently deliver multimedia content streams (i.e. content streams that comprise two or more components that have different media types) via the addition of extensions to the VXML standard. A telecommunications terminal periodically informs an IVR system of the Quality of Service (QoS) for transmissions received at the terminal. When an IVR system script specifies a multimedia content stream to be delivered to the terminal, the IVR system determines which components of the multimedia content stream can be delivered while maintaining QoS above a minimum acceptable threshold.

US Patent Application no. 2006/0203977 discloses an IVR system that generates video content to accompany the generated audio content, where the video content is based on the state of the IVR system, the video display capacity of the calling communications terminal, and information supplied by the user via the terminal. Video content is generated based on the text from which audio content is generated. In particular, the video content comprises an abridged version of the text that is suitable for display at the telecommunications terminal. The abridged version of the text is generated via syntactic and semantic processing of the text. In addition, an abridged version of user-supplied information is generated and incorporated in the video content.

US Patent Application no. US 2006/0203978 discloses an IVR system enabled, via VXML extensions, to specify the playback order, timing, and coordination of multiple content streams (e.g. whether an audio stream and a video stream should be played back concurrently or serially; whether a particular content stream should finish before playback of another content stream commences; whether a content stream that is currently playing should be stopped and supplanted with another content stream, etc.).

EP Patent Application no. 1701528 discloses an IVR system that generates an asynchronous event when there is a content stream-related occurrence during a call (e.g. completion of playback of the content stream; user control of the content stream, drop-off in QoS for the content stream), and the asynchronous event is caught by an appropriate event handler within the IVR system script. The event handler then spawns a separate thread that handles the event accordingly and executes in parallel with the IVR system script (i.e. the IVR system script continues handling the call while the thread executes).

SUMMARY OF THE INVENTION

The Applicant notes that a paradigm being common to known IVR systems employing audio and video communication channels is that the main information is provided by speech, whereas the video content is primarily used to accompany the content provided by speech. The service is therefore described by a VXML script, from which the video content is typically extracted. Known IVR systems employing video thus provide audio interactive services with the addition of video.

According to the Applicant, another paradigm may effectively apply to an interactive system employing video. Contrary to the paradigm described in the foregoing, this new paradigm considers video as the main communication channel, and speech as the secondary communication channel. Accordingly, an interactive system application should advantageously be embodied as an interactive "video portal" to be enjoyed with a videocommunication terminal, using voice as a possible accompanying secondary channel. In other words, according to the Applicant, an interactive system employing video should be embodied as a video interactive service, with the possible addition of audio.

However, implementing a video portal to be enjoyed by a videocommunication terminal, such as a videotelephone, is not an easy task. Indeed, general purpose videotelephones do not typically have web browsing capabilities, so that navigation within a video portal is not natively supported by a videotelephone.

The Applicant has realized that an interactive video portal, or video interactive service, can be implemented by including, in the web pages of the portal, specific portions defining associations between predefined user inputs (e.g. predefined keys to be pressed by the user on the videocommunication terminal's keypad) and specific browsing actions to be performed on the web pages, such as following hyper-links, filling form fields, etc. This can be achieved without the need of specific web browsing support in videocommunication terminals. Each web page to be shown on the user's videocommunication terminal is rendered and formed as an image in an apparatus of the system architecture. The image corresponding to the rendered web page is then video-encoded and sent (typically streamed) to the videocommunication terminal for being decoded and shown on the videocommunication terminal's display. When the user performs one of the browsing actions performable on the decoded image shown on the videocommunication terminal's display and corresponding to the web page (e.g. he/she presses a key corresponding to a hyper-link, or for filling a field of a form), the user input is delivered as a signaling event from the videocommunication terminal to the system implementing the service. The signaling event carrying the user's input is captured by the system and interpreted based on the association defined in the web page (e.g. a different web page is loaded, rendered and video-encoded as described above, or the echo character entered by the user is added to the rendered and video-encoded web page image and displayed at the user's videocommunication's terminal in the filled form-field).

In a first aspect the invention relates to a method of communication with a remote user provided with a videocommunication terminal.

The method comprises:
establishing a communication session with the user's videocommunication terminal;
loading a web page associated with the communication session, the loaded web page comprising at least one portion defining a respective association between at least one browsing action to be performed on the loaded web page and at least one predefined user interaction with the videocommunication terminal;
rendering the loaded web page and forming an image corresponding to the rendered loaded web page;
video-encoding the formed image so as to create an encoded video, and transmitting the encoded video to the user's videocommunication terminal;
concurrently to the transmitting of the encoded video, receiving information related to a predefined user interaction with the videocommunication terminal;
retrieving from the loaded web page the browsing action associated with the predefined user interaction with the videocommunication terminal;
executing the retrieved browsing action.

In a second aspect, the invention relates to a system for managing communication with a remote user provided with a videocommunication terminal.

The system comprises:
a call control manager module adapted to establishing a communication session with the user's videocommunication terminal;
at least one multimedia renderer module being in communication with said call control manager module, the at least one multimedia renderer module being adapted to:
loading a web page associated with the communication session, the loaded web page comprising at least one portion defining a respective association between at least one browsing action to be performed on the loaded web page and at least one predefined user interaction with the videocommunication terminal;
rendering the loaded web page and forming an image corresponding to the rendered loaded web page;
video-encoding the formed image so as to create an encoded video, and transmitting the encoded video to the user's videocommunication terminal;
receiving information related to a predefined user interaction with the videocommunication terminal, concurrently to the transmitting of the encoded video;
retrieving from the loaded web page the browsing action associated with the predefined user interaction with the videocommunication terminal;
executing the retrieved browsing action.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein:

FIG. 4 schematically shows a structure of a web page including a portion for associating browsing actions to predefined user interactions with the videocommunication terminal;

DETAILED DESCRIPTION OF THE INVENTION

Figure 1:
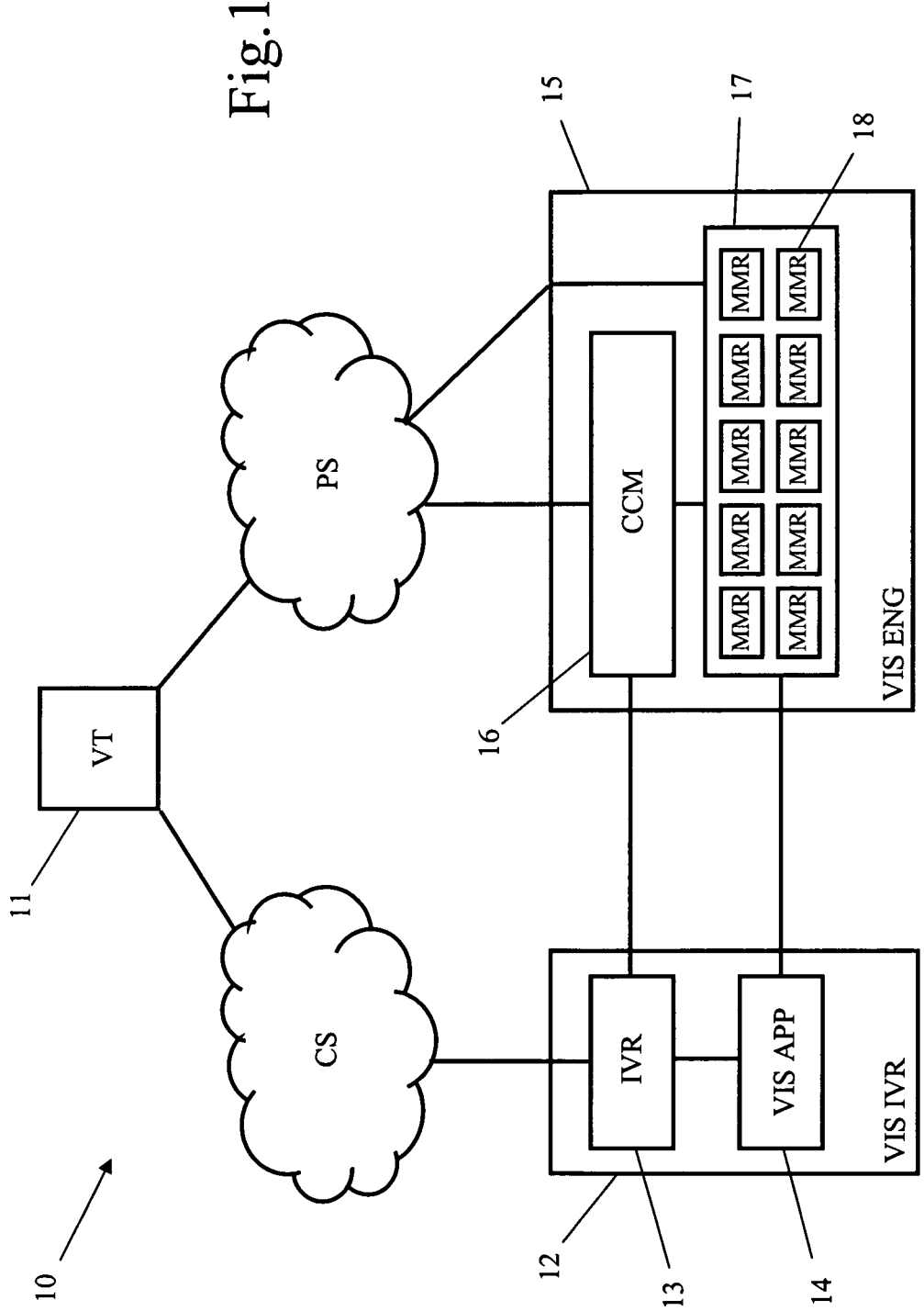
FIG. 1 schematically shows an exemplary system architecture supporting a video interactive service according to the invention.

FIG. 1 shows, in functional blocks sufficient for the purposes of the present invention, an exemplary system architecture 10 supporting a video interactive service according to the invention. It is pointed out that one or more of the functional blocks depicted in FIG. 1 may in practice be implemented totally in hardware, totally in software/firmware, or partly in hardware and partly in software/firmware.

In the system architecture 10, a user is provided with a videocommunication terminal (VT) 11 by which he/she can access the video interactive service. For the purposes of the present invention, by "videocommunication terminal" it should be intended a user terminal supporting audio and video communication sessions, transported on circuit-switched bearers, or on packet-switched bearers, or on a mix of circuit-switched bearers and packet-switched bearers. The VT 11 could be a dedicated terminal (such as a videotelephone), or a general purpose terminal (e.g. a personal computer) comprising software and hardware adapted for managing audio and video communication sessions. Hereinafter, the videocommunication terminal VT 11 will be termed "videotelephone", or simply "VT", for brevity. The VT 11 comprises at least a display for visualizing the video portion of the communication and a keypad comprising keys for alphanumeric selection. The VT 11 typically further comprises a loudspeaker (and/or an earphone) and a microphone for output/input of the audio portion of the communication. The VT 11 may further comprise a video camera.

Audio and video communication is managed by multimedia software or firmware installed at the VT 11. The multimedia software or firmware typically comprises at least one encoder module adapted for encoding audio and/or video information captured by the microphone and/or the video camera according to predefined format(s). The multimedia software or firmware further comprises at least one decoder module adapted for decoding audio and/or video information received from the other party involved in a communication with the VT 11 and encoded according to predefined format(s), in order to be enjoyed through the loudspeaker/earphone and/or the display of the VT 11. The encoding and decoding module(s) are commonly known as "codec(s)".

The VT 11 is connected to a telecommunications network. In the exemplary system architecture 10 the VT 11 is connected to a telecommunications network comprising a circuit-switched portion CS and a packet-switched portion PS (possibly in communication with each other via suitable interfaces and/or protocol conversion equipment). For example, the telecommunications network could be a conventional Public Switched Telephone Network (PSTN) supporting xDSL (Digital Subscriber Line) connections, and/or a Public Landline Mobile Network (PLMN) supporting audio and video communications (e.g. a UMTS network). As shown in FIG. 1, the VT 11 can connect both to the CS portion and to the PS portion of the telecommunications network.

A video interactive service (VIS) platform comprising a VIS IVR apparatus 12 and a VIS engine apparatus (VIS ENG) 15 is also connected to the telecommunications network. The VIS IVR apparatus 12 and the VIS ENG apparatus 15 are in communication with each other (via a dedicated connection or via the telecommunications network). For example, the VIS IVR apparatus 12 could be located on the premises of an enterprise offering the video interactive service to its customers, whereas the VIS ENG apparatus 15 could be located on the premises of a telecommunications operator. Alternatively, both the VIS IVR module 12 and the VIS ENG module 15 could be located in the same physical place (e.g. the enterprise premises, or the telecom operator premises).

The VIS IVR apparatus may optionally comprise a conventional IVR module 13 adapted for managing one or more conventional IVR applications, i.e. for managing audio interactive service sessions with the remote users as discussed in the background of the invention. IVR applications managed by the IVR module 13 may be created by VXML scripts, for example. The IVR module could be connected to the CS portion of the telecommunications network, as exemplary shown in FIG. 1, or also to the PS portion thereof (e.g. by using VoIP).

The VIS IVR apparatus 12 further comprises a VIS application (VIS APP) module 14 enclosing data related to one or more VIS applications. A VIS application comprises a hierarchy of web pages. The web pages comprise information to be typically interpreted and rendered by a web browser. The VIS APP module 14 may further comprise a web server adapted to receive web pages requests and to load the web pages of the VIS application(s). The web pages of the VIS application(s) could be defined with any language suitable for designing web pages, such as HTML (HyperText Markup Language), for example. The web pages may comprise hyper-links to other web pages (either belonging to the same VIS application, or to other VIS applications, or stored at external web sites). Alternatively, the hyper-links may direct to particular media objects (e.g. video clips, audio clips, images, etc.) stored in repositories at the VIS APP module 14 or at other sites, to be rendered in combination with the loaded web page. The web pages may further comprise or be embodied as application forms having input fields to be filled in with information by a user, to be submitted in order to gain authorization for accessing a restricted area, or to query a database, or for enrollment, etc.

Some information comprised in the web pages of the VIS application(s) may correspond to a series of browsing actions that the web pages could provide to the user. With a conventional web browser such browsing actions are typically executed with mouse gestures (pointing and clicking the hyper-links), and/or with aid of an alphanumeric keyboard for filling the form fields in. However, a typical videotelephone, such as the videotelephone VT 11 of FIG. 1, does not support web browser navigation and rendering of the web pages. According to an aspect of the invention, the web pages of the VIS application(s) managed by the VIS APP module 14 include respective associations binding specific browsing actions to predefined interactions of the user with the videotelephone. A typical user interaction with the videotelephone could be a striking of keys on the videotelephone's keypad. Associations between specific browsing actions and predefined user interactions with the videotelephone could be defined by suitable extension tags included in the web pages. Examples of possible extension tags of HTML pages will be provided in the remainder of the description.

The IVR module 13 and the VIS APP module 14 of the VIS IVR apparatus 12 may be in communication with each other for exchanging data. For example, authentication data could be exchanged between the IVR module 13 and the VIS APP module 14 in order to allow a user authenticated at the IVR module 13 (via an IVR application) to access a restricted portion of a VIS application managed by the VIS APP module 14 without the need to reenter user credentials.

The VIS ENG apparatus 15 comprises a call control manager (CCM) module 16, acting as a front-end module versus the telecommunications network, and a back-end module 17 being adapted to run a plurality of multimedia renderer (MMR) sub-modules 18.

The CCM module 16 is adapted to manage the establishing and the releasing of communication sessions for the video interactive service(s) with videocommunication terminals. In order to perform this task, the CCM module 16 is adapted to manage conventional signaling protocols, such as the Session Initiation Protocol (SIP). As shown in FIG. 1, the CCM module 16 may be connected to a PS portion of the telecommunications network. More particularly, the CCM module 16 routes an incoming call request from a VT 11 to an available MMR sub-module 18, thereby acting as a resource allocator of the MMR sub-modules 18. Once the session between the VT 11 and the selected MMR sub-module 18 is established, the CCM module 16 continues to manage possible signaling messages between the VT 11 and the selected MMR sub-module 18, e.g. to be notified when the session terminates in order to release the allocated MMR sub-module 18. Conversely, the content streams between the chosen MMR sub-module 18 and the VT 11 may occur directly, without passing through the CCM module 16. The total number of concurrent sessions may be under the control of the CCM module 16. The number of contemporary running MMR sub-modules 18 may also be under the control of the CCM module 16. More particularly, after a session with a MMR sub-module 18 terminates, the CCM module 16 will release the allocated MMR sub-module 18 thereby making it available for the next session request.

Each MMR sub-module 18 is adapted to render and video-encode web pages of a VIS application. For the purpose of receiving the web pages of the VIS applications, the MMR sub-modules 18 are in communication with the VIS APP module 14 of the VIS IVR apparatus 12. When receiving a web page during a VIS session, each MMR sub-module 18 renders the web page by forming a corresponding image. More particularly, the image corresponding to the web page may be temporarily created as an uncompressed raw image frame in a memory buffer of the MMR sub-module 18. Such uncompressed raw image frame is the binary representation of the image corresponding to the rendered web page, for example expressed in RGB, or YUV, or HSV color space.

The formed image is video-encoded according to a selected encoding format negotiated by the VT 11 in a negotiation phase for the establishment of the communication session. The encoded video is then transmitted to the VT 11 according to a protocol supported by the established communication session. Typical encoding formats for the video encoded image could be H 263, H264, MPEG4, etc. A typical protocol for the transmission of the video-encoded image could be the Real Time Protocol (RTP). The frame rate of the encoded video is negotiated by the VT 11 during the negotiation phase. The size of the image corresponding to the web page and formed by the MMR sub-module 18 is established based upon the size of the display of the VT 11 and communicated during the negotiation phase. The VT 11 can thus decode and display the received video corresponding to the loaded web pages by using the onboard multimedia audio/video decoder without the need of specific web browser capabilities provided on the VT 11.

The MMR sub-modules 18 are also adapted to receive and process data flow carrying information related to specific user interactions with the videotelephones during enjoyment of the VIS application. As disclosed above, user interactions typically correspond to specific keystrokes on the videotelephone's keypad, respectively associated with specific browsing actions on the loaded web pages. For example, the "*" key could correspond to the "submit" action of a web form displayed by the VT 11. In the above example, the "*" key is bound to the "submit" action with a suitable tag included in the web page script processed by the MMR sub-module 18. The information related to the key pressed by the user, encapsulated and transmitted in the data flow from the VT 11 and the sub-module 18 being party of the communication session, is detected and interpreted by the MMR sub-module 18, and the corresponding browsing action is retrieved from the script of the rendered web page, and accordingly executed.

To summarize the foregoing, the MMR sub-modules 18 behave as "remote web browsers" for the VT 11 with enhanced behavior, since the web pages are not simply loaded and rendered, but also video-encoded and transmitted to the VT 11.

Figure 2:
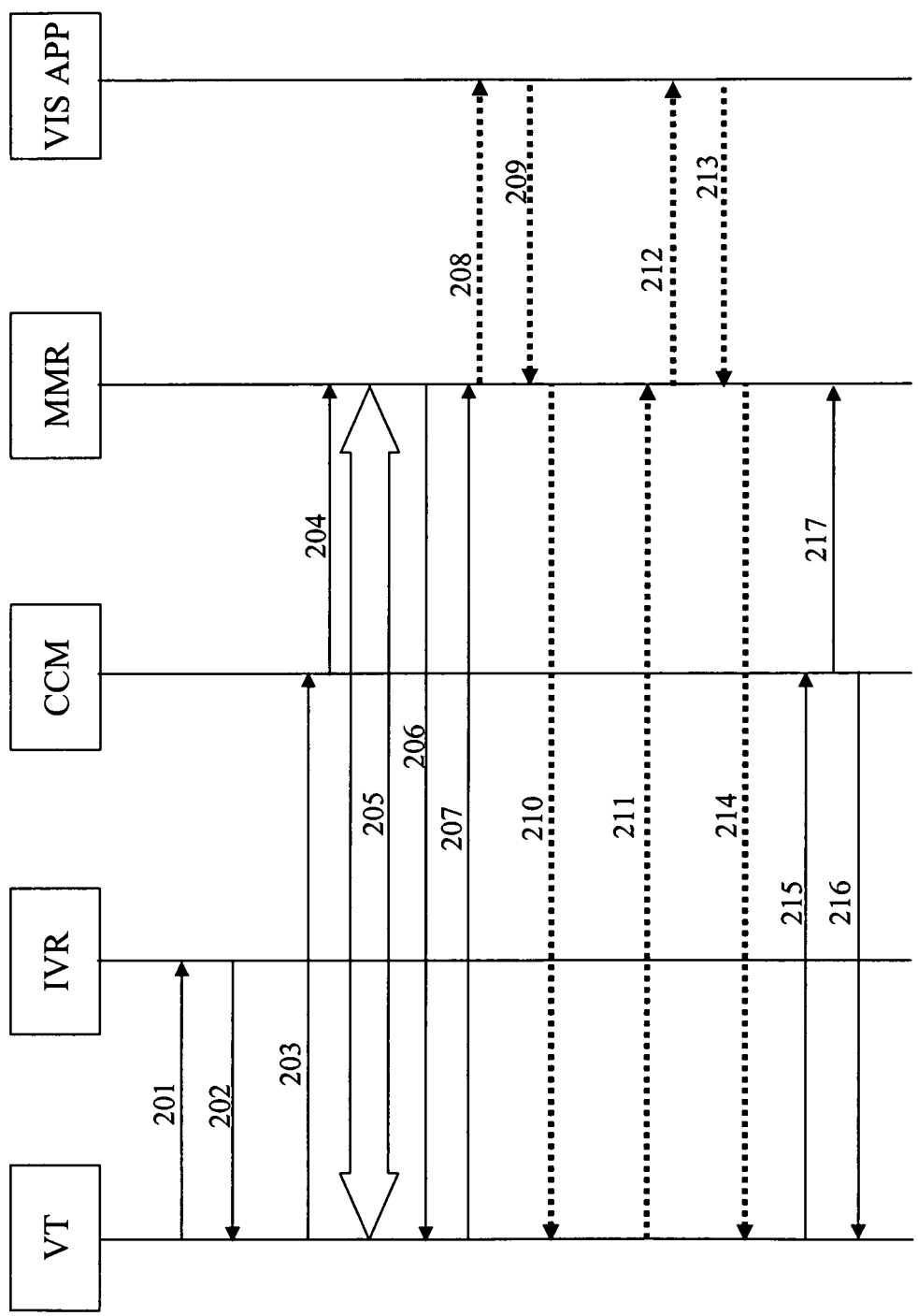
FIG. 2 shows an exemplary signaling and data flow for a video interactive service according to the invention.

FIG. 2 shows an exemplary signaling message and data flow exchanged between the VT 11 and various elements of the VIS platform shown in FIG. 1, for the establishment of a communication session and the enjoyment of a video interactive service according to the present invention.

The VT may first contact the IVR module (201), for example by dialing a predetermined telephone number. The IVR module could accept the call (202) established, for example, on a circuit-switched bearer. An IVR application is thus started in conventional manner. For example, the IVR application may request authorization credentials to the user, to be associated with the CLI (Client Line Identifier) of the VT. The association between the authorization credentials and the CLI of the user could be provided to the CCM (not shown in FIG. 2). DTMF tones may be exploited for transporting information corresponding to the keystrokes on the VT during the use of the IVR application.

During the enjoyment of the audio-only IVR application, the user could be prompted to access a video interactive service, for example by pressing a predetermined key on the VT's keypad. When the user presses the predetermined key, a call request signaling message carrying the identifier of the video interactive service is sent from the VT to the CCM (203). The call request signaling message could be, for example, a SIP INVITE message, if the SIP protocol is used for signaling. The CCM, possibly after checking the credentials of the calling VT by means of authorization information received from the IVR module, selects and allocates an available MMR sub-module, and forwards the call request thereof (204). The selected MMR sub-module negotiates with the VT the session characteristics (205), including transmission protocol to be used, parameters related to the video and, possibly, audio flow (e.g. video frame rate, video frame size, bit rate etc.). For example, the Session Description Protocol (SDP) is typically used to negotiate the session capabilities during this phase. If the negotiation succeeds (i.e. the two parties agree on common session parameters), a call accept signaling message is sent from the selected MMR sub-module to the VT (206) via the CCM. For example, the call accept signaling message could be a SIP 200 OK message. The reception of the call accept signaling message is acknowledged by the VT (207), so that the communication session between the VT and selected MMR sub-module is established.

At the establishment of the communication session, the MMR sub-module contacts the VIS APP module (208), to retrieve the home page of the service requested by the user. The request to the web server of the VIS APP module could be, for example, a HTTP GET request specifying the home page address of the service. The address of the home page could be associated with an identifier of the video interactive service (e.g. a SIP URI, or Uniform Resource Identifier), carried by the call request signaling originated from the VT (203), and passed to the MMR sub-module by the CCM in the call request forwarding (204). The VIS APP module loads and sends the requested home page to the requesting MMR sub-module (209). The MMR sub-module renders the received home page, forms a corresponding image thereof, stores the image in a memory area to be accessed by its encoder, video-encodes the image according to the protocol negotiated with the VT, and finally transmits the encoded video of the home page to the VT (210). The VT displays the home page image as if it was a "normal" video using its onboard multimedia decoder.

The home page loaded by the VIS APP module and sent to the MMR sub-module comprises, in suitable extension tags, at least one association binding a browsing action with a corresponding keystroke on the VT. For example, an association could be defined between a hyper-link to a different web page and the "3" key of the VT. When the user presses the "3" key, the corresponding DTMF tone is encapsulated in the data flow (for example according to RFC2833) sent from the VT to the MMR sub-module (211). The MMR sub-module receives encapsulated DTMF tone, retrieves from the home page being sent to the VT the address of the new web page associated with the DTMF tone, and requests the new web page to the VIS APP module, e.g. through another HTTP GET request (212). The VIS APP module loads and sends the requested new web page to the requesting MMR sub-module (213). The MMR sub-module renders the received new web page, forms a corresponding image thereof, stores the image in a memory area to be used by its encoder, video-encodes the image according to the protocol negotiated with the VT, and finally transmits the encoded video of the new web page to the VT (214).

The communication session could continue as described in the foregoing until the user decides that he/she wants to stop the communication, and/or a session timeout has expired. In the former case a call release signaling message is sent from the VT to the CCM (215). For example, the call release signaling message could be a SIP BYE message. The reception of the call release signaling message is acknowledged by the CCM (216), which releases the sessions with the VT and with the MMR sub-module allocated during the session (217), and resets the MMR sub-module in the idle state.

Figure 3:
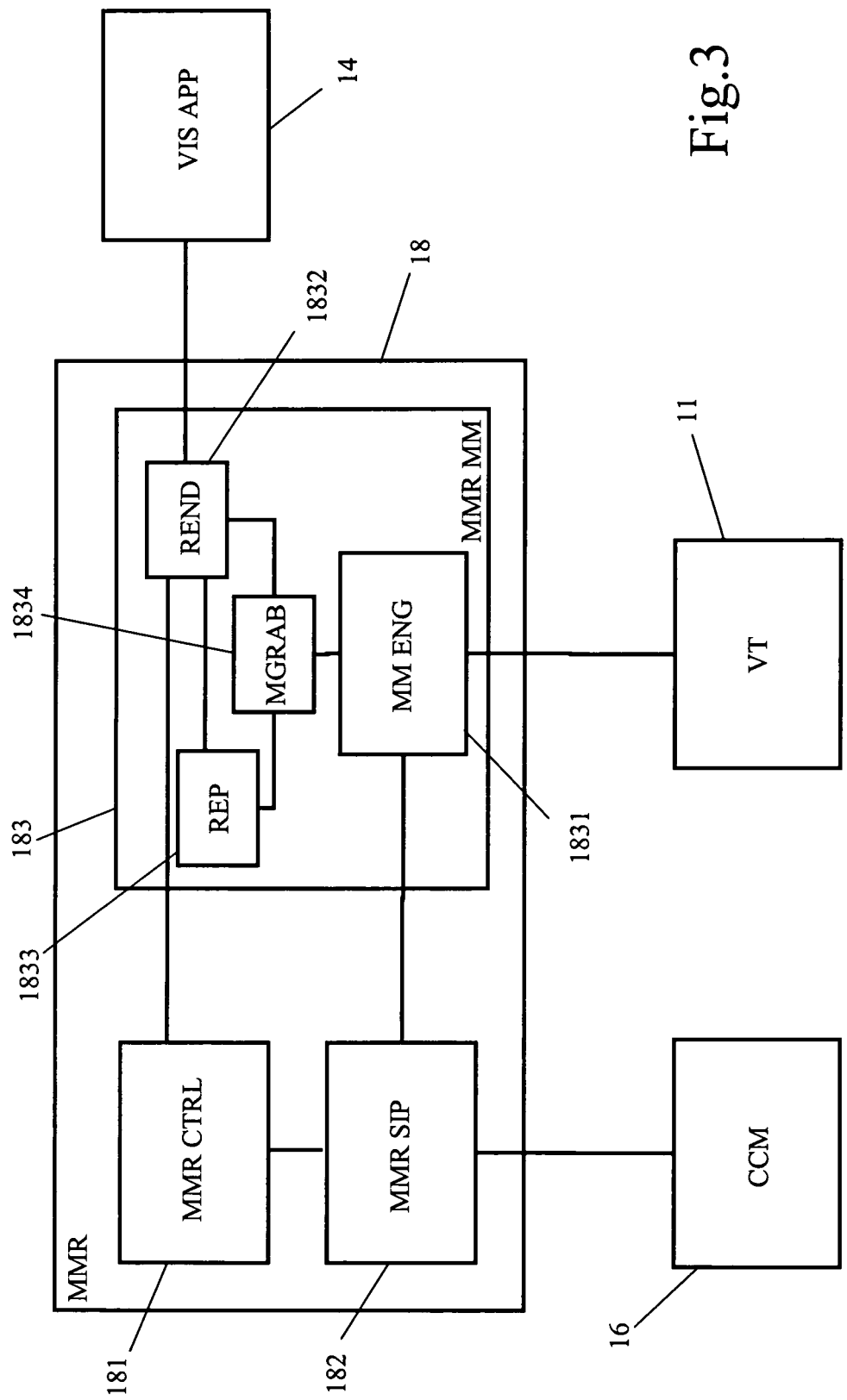
FIG. 3 schematically shows an exemplary multimedia renderer sub-module adapted to exchange information with a remote videocommunication terminal during a communication session of a video interactive service according to the invention.

FIG. 3 shows, in functional blocks sufficient for the purposes of the present invention, an exemplary embodiment of a MMR sub-module 18 to be used in the VIS ENG 15 of FIG. 1. It is pointed out that one or more of the functional blocks depicted in FIG. 3 may in the practice be implemented totally in hardware, totally in software/firmware, or partly in hardware and partly in software/firmware. The MMR sub-module 18 comprises a main control function (MMR CTRL) 181, a signaling control function (MMR SIP) 182, and a multimedia control function (MMR MM) 183.

The MMR CTRL function 181 is adapted to manage and/or coordinate the activities of the MMR sub-module 18, according to a control logic implemented therein. In particular, the MMR SIP function 182 and the MMR MM function 183 are under the control of the MMR CTRL function 181, which is configured to enable the procedures stored at the MMR SIP function 182 and at the MMR MM function 183 so as to comply with the video interactive service logic and the users' requests.

The MMR SIP function 182 is adapted to receive/transmit the signaling messages for opening, establishing, and releasing the communication sessions from/to the CCM module 16. In order to manage the negotiation and setting of the session parameters with the VT 11, the MMR SIP function 182 includes an interface towards the MMR MM function 183. In particular, the SIP MMR function 182 may implement methods and rules to be used by the signaling protocol (e.g. methods such as INVITE, BYE, 200 OK, ACK etc. in SIP) to manage the communication session. The MMR SIP function 182 performs these tasks under the control of the MMR CTRL function 181.

The MMR MM function 183 comprises a multimedia engine sub-function (MM ENG) 1831, a renderer sub-function (REND) 1832, a repository sub-function (REP) 1833, and a multi-grab sub-function (MGRAB) 1834.

The MM ENG sub-function implements the multimedia stack adapted to manage the audio, video, and data communication flows with the VT 11. In particular, the MM ENG sub-function 1831 stores the encoders and decoders (codecs) needed for the transmission and reception of the audio and video flows to and from the VT 11. The establishment of the encoding and decoding parameters (e.g. frame rate, frame size, bit rate, etc.) is performed in accordance with the information received by the MMR SIP sub-function 182.

The REND sub-function 1832 is adapted to perform the processing of the web pages received from the VIS APP module 14, by rendering and forming the corresponding images thereof. In particular, the REND sub-function may comprise a memory buffer where images are temporarily stored for being loaded and encoded by the MM ENG sub-function (via the MGRAB sub-function 1834, as will be detailed in the remainder of the description). The REND sub-function 1832 is also adapted to process the received information related to the user interactions with the VT 11 during enjoyment of the video interactive service. In particular, the REND sub-function 1832 is capable of processing the information related to the keystrokes on the VT 11 to retrieve the browsing action associated to the pressed keys. Moreover, the REND sub-function 1832 manages the communication with the VIS APP module 14 to request web pages and other objects (e.g. images, audio files, etc.) stored in the VIS APP module 14 and needed to render the web pages. The REND sub-function 1832 works under the control of the MMR CTRL function 181. In particular, it receives from the MMR CTRL function 181 the home page address to be requested to the VIS APP module 14 when a new communication session of a video interactive service is established.

The REP sub-function 1833 is adapted to store ancillary objects to be mixed with the images of the rendered web pages to realize particular audio and/or video effects. For example, the image of an hourglass could be mixed with the image corresponding to the current web page during the loading and processing of another web page requested by a browsing action of the user. Other objects, such video and/or audio clips, could be stored in the REP sub-function 1833. For example, an audio clip could be retrieved to accompany the transmission of a video-encoded web page, or a set of video-encoded web pages. The selection of the ancillary object(s) to be mixed with the image of the web page(s) is performed by the REP sub-function 1833 under the control of the REND sub-function 1832.

The MGRAB sub-function 1834 is adapted to load the images of the web pages and the ancillary objects to be encoded by the MM ENG sub-function 1831. In particular, the MGRAB sub-function mixes the images with the ancillary objects prior to the audio/video encoding performed by the MM ENG sub-function 1831.

FIG. 4 depicts an exemplary implementation of a web page script including extension tags provided for associating browsing actions on the web page with user interactions with the videotelephone. The web page script shown in FIG. 4 represents a generic HTML page, with a conventional heading section (between tags <head> and </head>) and a body section (between tags <body> and </body>). Extension tags binding the browsing action(s) with user interaction(s) may be, for example, specified in the heading section of the HTML page, as described in FIG. 4 within the <VIS EXTENSIONS> and <NIS EXTENSIONS> tags. Such extension tags are interpreted by the REND sub-function 1832 (see FIG. 3). Furthermore, the tags <COMMAND1 . . . >, <COMMAND2 . . . >, etc., each define a different browsing action performable on the web page. Each <COMMAND (n)> tag is further characterized by one or more attributes (parameter="value" pair) that define the association between a keystroke on the videotelephone's keypad and a specific browsing action.

For example, videotelephones with sixteen-key keypads (0, 1, ..., 9, *, #, ←, ↑, →, ↓), each key being associated with a respective DTMF tone as described in table 1, allow sixteen different browsing actions to be performed on each rendered web page. As described in the foregoing, the DTMF tone is encapsulated in the data flow encoded and sent from the videotelephone to the video interactive service platform.

TABLE 1

| Key | DTMF Tone |
|-----|-----------|
| 0 | DTMF0 |
| 1 | DTMF1 |
| 2 | DTMF2 |
| 3 | DTMF3 |
| 4 | DTMF4 |
| 5 | DTMF5 |
| 6 | DTMF6 |
| 7 | DTMF7 |
| 8 | DTMF8 |
| 9 | DTMF9 |
| * | DTMF* |
| # | DTMF# |
| ↑ | DTMFA |
| ↓ | DTMFB |
| ← | DTMFC |
| → | DTMFD |

EXAMPLE 1

A possible series of browsing actions on a web page whose size is larger than the display of the videotelephone could allow the scrolling of the page in all four directions (up, down, left, right). These four browsing actions may respectively be associated with the four "arrow" keys of the videotelephone (←, ↑, →, ↓). The excerpt of a possible extension tag to be included in the HTML script and defining the above binding association could be the following:

```
<VIS EXTENSIONS>
    <VIS_PAGE scroll_up="DTMFA" scroll_down="DTMFB"
    scroll_left="DTMFC" scroll_right="DTMFD">
</VIS EXTENSIONS>
```

EXAMPLE 2

Extension tags could be defined to bind a keystroke on the videotelephone's keypad and a hyper-link to a different web page. For example, the following extension tag binds the "1" key to the page "next.html".

```
<VIS EXTENSIONS>
    <VIS_A id="DTMF1" href="next.html" >
</VIS EXTENSIONS>
```

EXAMPLE 3

Figure 5:
FIG. 5 shows an exemplary image shown on a user's videocommunication terminal corresponding to a web page loaded during a communication session of a video interactive service according to the invention.

Extension tags could define how a form field in a web page could be filled in with the aid of the videotelephone's keypad. For example, FIG. 5 shows an image corresponding to an application form comprising a Username and a Password form fields requested to a user for, e.g., authentication purposes. In this example the user should be able to fill in his/her Username and Password information, to move the input focus up and down the two fields, to submit the form, to cancel mistyped characters, or to reset the content of the fields.

The following is an excerpt of the HTML page corresponding to the application form shown in FIG. 5. When the form is submitted, page "QCIF02.asp" is loaded by the platform. In the extension tag portion, various binding associations are defined (which for the purposes of the present invention are meant as particular browsing actions), in particular:

- key "*" is bound to the action of submitting the form;
- key "#" is bound to the action of resetting the fields' content;
- keys "0" ... "9" are bound to text characters in the field with current focus, which initially is the Username field;
- key "←" (see Table 1) is bound to the "backspace" action, thereby canceling one character on the left;
- key "↓" (see Table 1) is bound to the "move-to-next-field" action, thereby causing the focus to move to the next form field;
- key "↑" (see Table 1) is bound to the "move-to-previous-field" action, thereby causing the focus to move to the previous form field;
- key "→" (see Table 1) is bound the "rotate-alphabetic-character" action, thereby rotating among all alphabetic characters conventionally associated with a given numeric key (e.g. "ABC" is typically associated with the "2" key, etc.). This binding action thus allows the use of alphabetic characters in the form fields. For example, the following keystroke sequence will result in the string "BABA" in a field: "2""→""→" "2""→" "2""→""→" "2""→".

```
<html>
<head>
    <VIS_EXTENSIONS>
        <VIS_ FORM   submit="*"   reset="#"   text-
        ins="0123456789"   text-delchar="DTMFC"   input-
        rotate="DTMFD"   inputprev="DTMFA"   input-
        next="DTMFB" >
    </VIS_EXTENSIONS>
</head>
<body>
    <form name="form1" method="get" action="QCIF02.asp">
    </form>
    <table width="160" height="120">
        <tr><td colspan="3">Username<input name="Usern"
        type="text" size="10" height="12"></td></tr>
        <tr><td colspan="3">Password<input name="Passw"
        type="password" size="10" height="12"></td></tr>
    </table>
</body>
</html>
```

The present invention has been disclosed and described by way of some embodiments thereof. However it is apparent to those skilled in the art that several modifications to the described embodiments, as well as other embodiments of the present invention are possible, for example for meeting contingent needs, without departing from the scope thereof as defined in the appended claims.

For example, while the VIS platform has been described as being composed by two separate apparatus (the VIS IVR 12 and the VIS ENG 15), this has not to be considered as limiting the invention, since the platform could be implemented in any number of apparatus (from one to any number). Furthermore, the presence of a conventional IVR is not essential for the present invention.

The invention claimed is:

1. A method of communication with a remote user provided with a videocommunication terminal, comprising:
   establishing a communication session with the user's videocommunication terminal;
   loading a web page associated with the communication session, the loaded web page comprising at least one portion defining a respective association between at least one browsing action to be performed on the loaded web page and at least one predefined user interaction with the videocommunication terminal associated with at least one predefined key on said user's videocommunication terminal;
   rendering the loaded web page and forming an image corresponding to the rendered loaded web page;
   video-encoding the formed image so as to create an encoded video, and transmitting the encoded video to the user's videocommunication terminal;
   concurrently with the transmitting of the encoded video, receiving information related to a predefined user interaction with the videocommunication terminal;
   retrieving from the loaded web page the browsing action associated with the predefined user interaction with the videocommunication terminal; and
   executing a retrieved browsing action.

2. The method according to claim 1, wherein said forming an image corresponding to the rendered loaded web page comprises creating an image frame corresponding to the rendered loaded web page in a memory buffer.

3. The method according to claim 2, wherein said creating an image frame corresponding to the rendered loaded web page in a memory buffer comprises composing an uncompressed image frame of the rendered loaded web page in said memory buffer.

4. The method according to claim 1, wherein said establishing of the communication session with the user's videocommunication terminal is performed in response to a call request received from said user's videocommunication terminal.

5. The method according to claim 4, wherein said loading of said web page associated with the communication session is performed based on an identifier carried by said call request.

6. The method according to claim 1, wherein said information associated with a predefined user interaction with the videocommunication terminal comprises a predefined dual tone multifrequency tone.

7. The method according to claim 6, wherein said dual tone multifrequency tone is encapsulated in a data flow sent by the videocommunication terminal in response to said predefined user interaction with the videocommunication terminal.

8. The method according to claim 1, wherein said communication session with the user's videocommunication terminal is at least partially established on a packet-switched bearer.

9. The method according to claim 1, wherein said communication session supports session initiation protocol.

10. The method according to claim 1, wherein said encoded video is transmitted according to a real time protocol.

11. A system for managing communication with a remote user provided with a videocommunication terminal, comprising:
    a call control manager module capable of being adapted to establish a communication session with the user's videocommunication terminal;
    at least one multimedia renderer module capable of being in communication with said call control manager module, the at least one multimedia renderer module capable of:
       loading a web page associated with the communication session, the loaded web page comprising at least one portion defining a respective association between at least one browsing action to be performed on the loaded web page and at least one predefined user interaction with the videocommunication terminal associated with at least one predefined key on said user's videocommunication terminal;
       rendering the loaded web page and forming an image corresponding to the rendered loaded web page;
       video-encoding the formed image so as to create an encoded video, and transmitting the encoded video to the user's videocommunication terminal;
       receiving information related to a predefined user interaction with the videocommunication terminal, concurrently with the transmitting of the encoded video;
       retrieving from the loaded web page the browsing action associated with the predefined user interaction with the videocommunication terminal; and
       executing the retrieved browsing action.

12. The system according to claim 11, wherein said multimedia renderer module is capable of being adapted to form said image corresponding to the rendered loaded web page by creating an image frame corresponding to the rendered loaded web page in a memory buffer of said multimedia renderer module.

13. The system according to claim 12, wherein said multimedia renderer module is capable of being adapted to create said image frame corresponding to the rendered loaded web page in a memory buffer by composing an uncompressed image frame of the rendered loaded web page in said memory buffer.

14. The system according to claim 11, wherein said call control manager module is capable of being adapted to establish the communication session with the user's videocommunication terminal in response to a call request received from said user's videocommunication terminal.

15. The system according to claim 14, wherein said multimedia renderer module is capable of being adapted to load said web page associated with the communication session based on an identifier received by the call control manager module and carried by said call request.

16. The system according to claim 11, wherein said information associated with a predefined user interaction with the videocommunication terminal comprises a predefined dual tone multifrequency tone.

17. The system according to claim 16, wherein said dual tone multifrequency tone is encapsulated in a data flow sent by the videocommunication terminal in response to said predefined user interaction with the videocommunication terminal.

18. The system according to claim 11, wherein said call control manager module is capable of being adapted to establish said communication session with the user's videocommunication terminal at least partially on a packet-switched bearer.

19. The system according to claim 11, wherein said call control manager module is capable of being adapted to support session initiation protocol.

20. The system according to claim 11, wherein said multimedia renderer module is capable of being adapted to transmit said encoded video according to a real time protocol.

* * * * *